United States Patent
Tseng et al.

(10) Patent No.: US 9,104,309 B2
(45) Date of Patent: Aug. 11, 2015

(54) PATTERN SWAPPING METHOD AND MULTI-TOUCH DEVICE THEREOF

(71) Applicant: HTC Corporation, Taoyuan County (TW)

(72) Inventors: Fu-Chang Tseng, Taoyuan County (TW); Jing-Lung Wu, Taoyuan County (TW); Hsin-Ti Chueh, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 219 days.

(21) Appl. No.: 13/869,982

(22) Filed: Apr. 25, 2013

(65) Prior Publication Data
US 2014/0320418 A1    Oct. 30, 2014

(51) Int. Cl.
| | |
|---|---|
| *G09G 5/00* | (2006.01) |
| *G09G 5/02* | (2006.01) |
| *G06F 3/048* | (2013.01) |
| *G06T 5/00* | (2006.01) |
| *G06T 3/40* | (2006.01) |
| *G06F 3/0488* | (2013.01) |

(52) U.S. Cl.
CPC .. *G06F 3/04883* (2013.01); *G06F 2203/04808* (2013.01)

(58) Field of Classification Search
USPC .......... 345/599, 619, 660, 156, 175, 179; 382/162, 165, 167, 276, 282, 298; 715/700, 764, 860, 863, 866
See application file for complete search history.

(56) References Cited

U.S. PATENT DOCUMENTS

| | | | |
|---|---|---|---|
| 2006/0001650 A1 | 1/2006 | Robbins | |
| 2011/0209089 A1 | 8/2011 | Hinckley | |
| 2011/0275412 A1* | 11/2011 | Khawand | 455/566 |
| 2012/0084682 A1 | 4/2012 | Sirpal | |
| 2012/0176401 A1* | 7/2012 | Hayward et al. | 345/619 |
| 2012/0194447 A1* | 8/2012 | Lin et al. | 345/173 |
| 2012/0311438 A1* | 12/2012 | Cranfill et al. | 715/256 |
| 2012/0327009 A1* | 12/2012 | Fleizach | 345/173 |
| 2013/0069987 A1 | 3/2013 | Choe | |
| 2013/0300674 A1* | 11/2013 | Davidson | 345/173 |
| 2014/0240539 A1* | 8/2014 | Hayward et al. | 348/231.6 |

OTHER PUBLICATIONS

Office action mailed on Jan. 23, 2015 for the Taiwan application No. 102133622, filed Sep. 17, 2013, p. 1-9.

* cited by examiner

*Primary Examiner* — Wesner Sajous
(74) *Attorney, Agent, or Firm* — Winston Hsu; Scott Margo

(57) ABSTRACT

Patterns displayed on a touch screen are swapped in response to occurrence or movements of touch points on the touch screen. Therefore, when a user of the multi-touch device including the touch screen intends to swap patterns displayed on the touch screen, he or she is merely required to give a few simultaneous touches corresponding to the patterns on the touch screen or to simply move the patterns on the touch screen using simultaneous touches.

15 Claims, 9 Drawing Sheets

PATTERN SWAPPING METHOD AND MULTI-TOUCH DEVICE THEREOF

BACKGROUND OF THE INVENTION

1. Field of the Invention

The present invention relates to a pattern swapping method and an electronic device thereof, and more particularly, a pattern swapping method for swapping patterns corresponding to at least two touch points on a touch screen of the electronic device and said electronic device thereof.

2. Description of the Prior Art

In recent multi-touch electronic devices equipped with a touch screen, pattern-related applications, such as a painting application or an album-editing application, may be utilized for generating or editing image files by editing colors of sub-images of the image file.

Under the case of a painting application, when a user of the multi-touch electronic device intends to paint an object on the touch screen, he or she may be required to pick a color object in advance for determining the color to be used by the user, and to pick an object to be dyed using the picked color. Using such painting instructions may be inconvenient for the user because of complicated operations, and more inconveniences are introduced as the user intends to use more colors to paint an object on the touch screen.

Under the case of an album-editing application, a user may feel like replacing some sub-images of an original image, for example, replacing a face appearing in the original image with another funny cartoon idol's face. Under this condition, the user may be required to click on an original face sub-image of the original image, to move the original face sub-image away by dragging the mouse, to click on the cartoon idol's face sub-image, and to drag the cartoon idol's face sub-image to the location where the original face sub-image is located; as can be observed, the whole process is complicated for the user, and similarly, the process will get more complicated as more sub-images are required to be replaced.

SUMMARY OF THE INVENTION

The claimed invention discloses a pattern swapping method for swapping patterns on a multi-touch device. The pattern swapping method comprises detecting whether there are a plurality of touch points on a touch screen of a multi-touch device, wherein each of the plurality of touch points is corresponding to a pattern displayed on the touch screen; and swapping patterns corresponding to the plurality of touch points on the touch screen when the plurality of touch points are simultaneously detected on the touch screen.

The claimed invention further discloses a pattern swapping method for swapping patterns on a multi-touch device. The pattern swapping method comprises detecting whether there are a plurality of touch points on a touch screen of a multi-touch device and whether the plurality of touch points are simultaneously moved on the touch screen, wherein each of the plurality of touch points is corresponding to a pattern displayed on the touch screen; and swapping patterns corresponding to the plurality of touch points on the touch screen in response to movements of at least two of the plurality of touch points that are simultaneously detected on the touch screen when the plurality of touch points are simultaneously detected and when occurrence of the movements of the at least two of the plurality of touch points are simultaneously detected on the touch screen.

The claimed invention discloses a multi-touch device. The multi-touch device comprises a touch screen, a sensor and an image processor. The sensor is coupled to the touch screen for detecting whether there are a plurality of touch points on the touch screen. The image processor is coupled to the sensor and the touch screen for swapping patterns corresponding to the plurality of touch points on the touch screen in response to a result of detecting whether there are the plurality of touch points on the touch screen by the sensor. Each of the plurality of touch points is corresponding to a pattern displayed on the touch screen.

These and other objectives of the present invention will no doubt become obvious to those of ordinary skill in the art after reading the following detailed description of the preferred embodiment that is illustrated in the various figures and drawings.

DETAILED DESCRIPTION

For facilitating a user of an electronic device equipped with a touch screen in using image editing applications, the present invention discloses a pattern swapping method utilized on an electronic device supporting multi-touch and the electronic device thereof.

Figure 1:
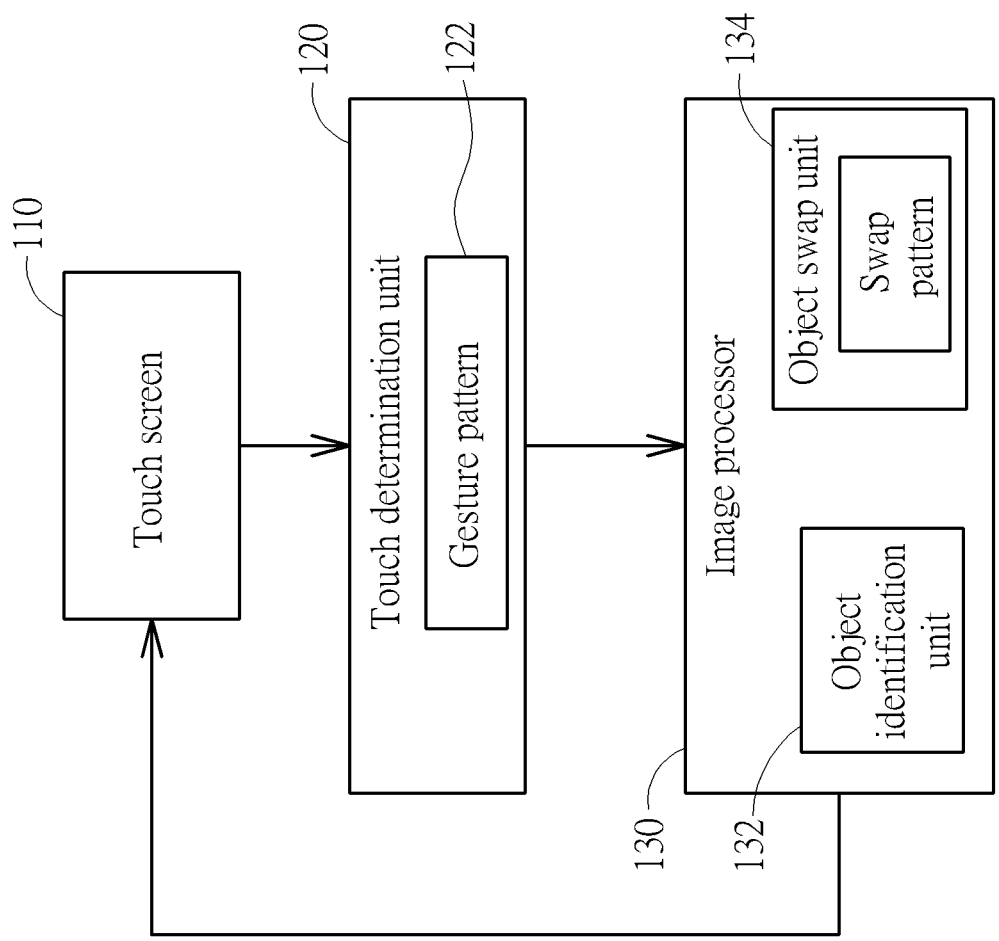
FIG. 1 illustrates an electronic device according to one embodiment of the present invention.

Please refer to FIG. 1, which illustrates an electronic device 100 according to one embodiment of the present invention. As shown in FIG. 1, the electronic device 100 comprises a touch screen 110, a touch determination unit 120 and an image processor 130.

The touch screen 110 is configured to display at least an image and/or a user interface of an image application and to receive inputs from the user of the electronic device 100. The inputs may be in the form of contacts on the touch screen 110 by finger, stylus, pen and/or other suitable input devices. In one embodiment of the invention, the touch screen 110 supports multi-touch inputs, i.e. contacts of multiple touch points simultaneously. That is to say, user might use two or more fingers to send inputs via the touch screen 110 for performing specific operation or task. In one embodiment of the invention, the touch screen 110 is composed by a touch panel and a display screen (not separately shown). The touch panel is configured to detect contacts of touch points from the user and transmit touch signals comprising information of the touch points. The display screen is configured to display images and/or user interfaces of various applications. The touch signals transmitted from the touch screen 110 are received by the touch determination unit 120. Generally the touch screen 110 would send touch signals comprising absolute address of the touch points. The touch screen 110 would constantly monitor any contact thereon and send touch signals notifying detected contacts to the touch determination unit 120. The touch determination unit 120 receives the touch signals and maps the touch coordinates to positions or areas of the displayed image. Moreover, the touch determination unit 120 keeps track of touch signals received over a period of time. In one embodiment of the invention, the touch determination unit 120 may determine gesture pattern of the touch points and determine whether the gesture pattern satisfies predetermined ones. The touch determination unit 120 may comprise a gesture pattern table 122, which records one or more predetermined gesture patterns. Each gesture pattern may correspond to a specific operation. For example, in response to the movements of the touch points form a clockwise path, the objects/items in the image corresponding to the touch points are exchanged in clockwise order. The information comprising the position and/or the gesture pattern is send to the image processor 130 for further processing.

The image processor 130 comprises, among others, an object identification unit 132 and an object swap unit 134. The object identification unit 132 is configured to identify objects/items corresponding to the touch points. The objects/items can be identified according to the image characteristics corresponding to the touch points, for example color. In another embodiment of the invention, the objects/items are identified according to a predefined algorithm, such as face detection, edge detection, and/or other suitable algorithm. Moreover, the object identification unit 132 is configured to further identify other objects/items within the image having the same characteristics with the identified objects/items corresponding to the touch points. For example, in response to the touch points corresponding to two objects with different colors, the object identification unit 132 further identifies other objects of the same and/or similar colors. The object swap unit 134 is configured to swap image characteristics of the identified objects/items according to the determination result of the object identification unit 132 and/or the gesture pattern determined by touch determination unit 120. In one embodiment of the invention, the object swap unit 134 swaps colors of all objects of a first color and a second color with each other, i.e. change object in the first color to the second color and vice versa. In another embodiment of the invention, the object swap unit swaps colors of all objects of a first color, a second color and a third color in an order determined by gesture pattern. For example, if the relative positions of touch points corresponding to the colors are sorted from left to right (i.e. the first color at left and the third color at right), and the gesture pattern is in clockwise direction, the first color is swapped to the second color, the second color is swap to the third color, and the third color is swapped to the first color. In another example that the gesture pattern is in counter-clockwise direction, the first color is swapped to the third color, the second color is swapped to the first color and the third color is swapped to the second color. The exchange order of the colors is determined according to the gesture pattern. Once the object swap is done, the image processor then refreshes the image according to the swap result and updates the refreshed image to the touch screen 110 for display to the user.

Figure 2:
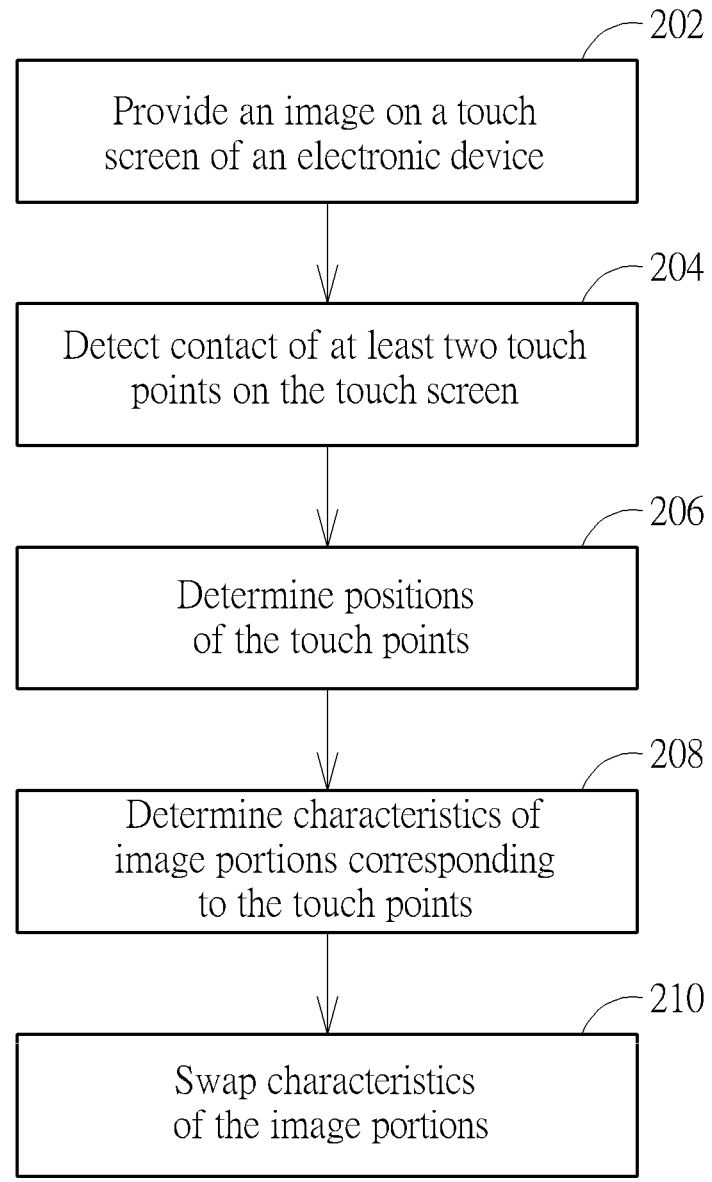
FIG. 2 illustrates a pattern swapping method for use in an electronic device according to an embodiment of the invention.

FIG. 2 illustrates a pattern swapping method for use in an electronic device according to an embodiment of the invention. The electronic device of the embodiment comprises, among others, a touch screen which supports multi-touch inputs. The pattern swapping method comprises following steps:

Step 202: Provide an image on the touch screen of the electronic device. The image may be captured by the electronic device, or be accessed internally or externally. For example, the image may be accessed from another electronic device via wireless transmission. The touch screen may also provide a user interface for receiving commands from the user. These commands may be used to enable image swapping, select characteristic for swapping, and/or others used for editing the image.

Step 204: Detect contacts of at least two touch points on the touch screen. The touch screen detects whether user makes contact to it. And in response to contacts are made, the touch screen identifies the touch points and transmits touch signals comprising information of the touch points. In the embodiments of the invention, the touch points can be two or more. Please note that the contacts of the touch points can be made simultaneously or sequentially.

Step 206: Determine positions in the image corresponding to the touch points in the image. The touch signals may comprise address information of the touch points on the touch screen. The address of the touch points can be converted and mapped to positions in the image. Accordingly, pixels corresponding to the positions can be identified.

Step 208: Determine characteristics of image portions corresponding to the positions. Based on the positions in the image corresponding to the touch inputs, image characteristics can be extracted, for example color or shape, etc. The positions can be used as starting points and expand to image portions comprising the same or similar characteristics. The image characteristics can be determined by user, predefined or automatically selected.

Step 210: Swap characteristics of the image portions. Once image portions corresponding to the touch points and corresponding characteristics are determined, characteristics of the image portions are swapped. The swapping may be performed by exchanging color values of the image portions or exchanging positions of the image portions.

In the embodiment that color characteristics is selected for swapping, for a given position, color values of pixels within a small region enclosing the given position are used to determine the final color in Step 208. The final color may be determined by filtering color values of pixels within the small region (to exclude noise pixels), performing average operation on the filtered color values, etc. Other process may also be utilized. Starting from the given position, nearby pixels are examined to compare whether their color values is identical or similar to the final color. A color tolerance may be set to include pixels with similar color. Pixels with identical or similar color values are included to form an image portion corresponding to the final color for example. Please note that pixels with different colors but surrounded by pixels with identical or similar color are also included in the image portion since they might be defect pixels. Accordingly, image portions corresponding to the touch points and their color characteristics can be determined. In Step 210, color values of the image portions are swapped by changing color values of pixels of an image portion to the color of another image portion.

In the embodiment that the image characteristic is selected as object shape such as face, face detection is performed to find the image portions corresponding to the touch points in Step 208. The image characteristics may comprise edge, size and/or other information of the detected faces. And in Step 210, the detected faces are swapped by updating pixel values of an image portion with pixel values of another image portion. Please note that the image portion may be scaled according to the size of the other image portion to be swapped with. For example, the touch points correspond to a large elliptic object and a small circular object respectively. The elliptic object is scaled down to smaller size approximated (but may be a bit larger) to the size of the circular object. Meanwhile the circular object is scaled up to larger size approximated to the size of the elliptic object. As a result, pixels nearby the image portions may be updated as well.

Please refer to FIGS. 3-7, which illustrate embodiments of pattern swapping of the invention. The swapping order can be determined by the movement of the touch points, system predefined, or predetermined by user.

Figure 3:
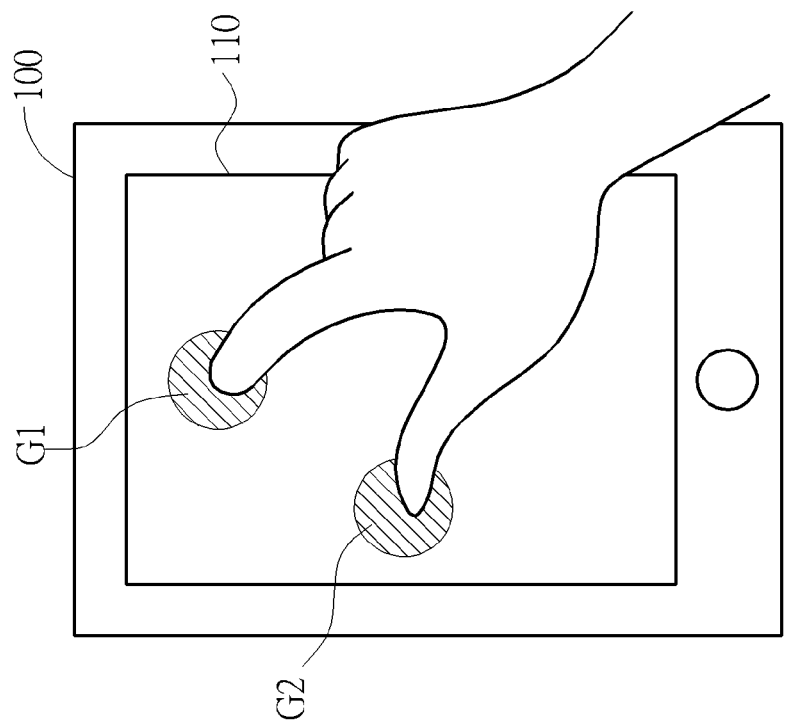
FIG. 3 illustrates an image swapping method according to one embodiment of the present invention.
Figure 3:
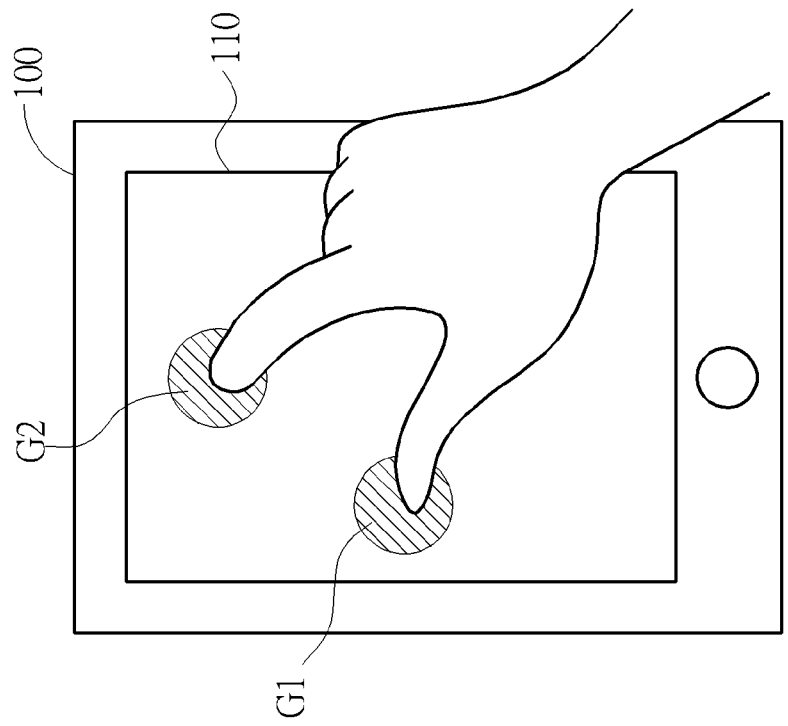

FIG. 3 illustrates an image swapping method according to one embodiment of the present invention. As shown in FIG. 3, two touch points G1 and G2 are triggered by fingers of the user. In response to the contacts of the touch points G1 and G2 are detected by the touch screen 110, the image processor 130 is configured to swap image portions corresponding to the touch points G1 and G2 on the touch screen 110 so that image portions corresponding to the touch points G1 and G2 are exchanged with each other.

In response to contacts of more than two touch points are detected on the touch screen 110, the image swapping may be implemented in a predetermined manner or in a random manner in some embodiments of the present invention. As described in FIG. 1, the gesture pattern of the movement of the touch points can be determined and image portions corresponding to the touch points are swapped in a manner determined by the gesture pattern of the touch points. A gesture pattern table and a swap pattern table are used as references for determining the swapping manner in an embodiment of the invention.

Figure 4:
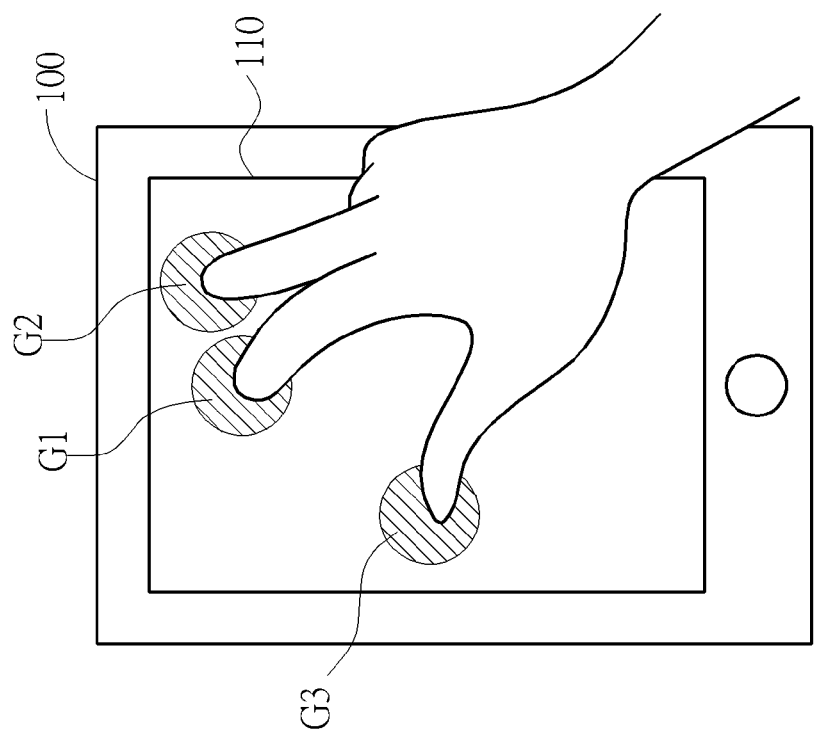
FIG. 4 illustrates image swapping of touch points G1, G2 and G3 according to one embodiment of the present invention.
Figure 4:
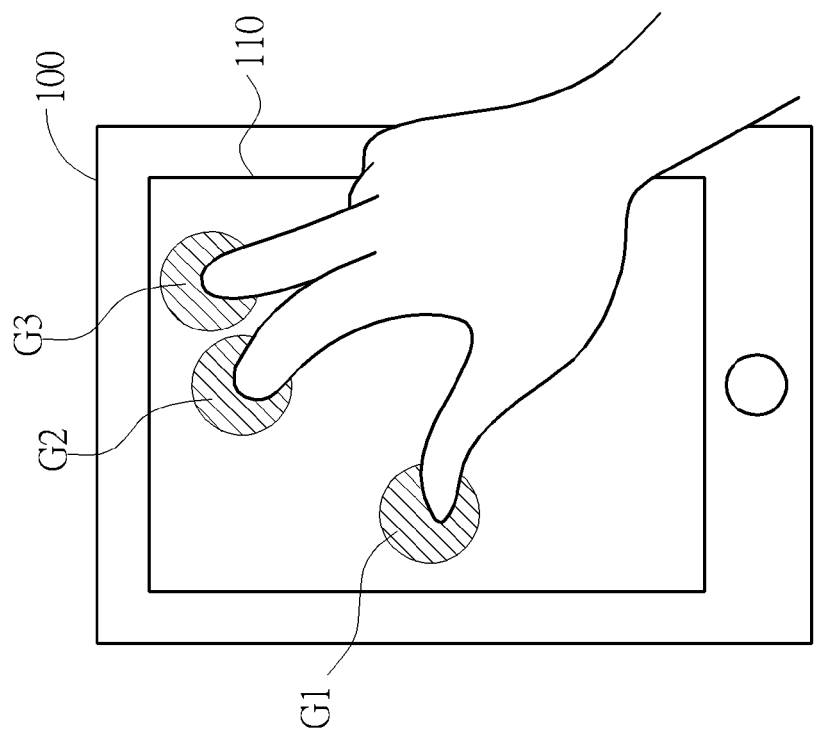

FIG. 4 illustrates image swapping of touch points G1, G2 and G3 according to one embodiment of the present invention. As can be observed in FIG. 4, a relative order of the touch points with respect to finger positions from left to right is (G1, G2, G3) before swapping. After swapping, the relative order of the touch points is (G3, G1, G2), which is shifted in clockwise order. In addition to clockwise order, counter-clockwise order or random order may also be implemented in embodiments of the present invention depending on the gesture pattern of the touch points or predetermined by system or user.

Figure 5:
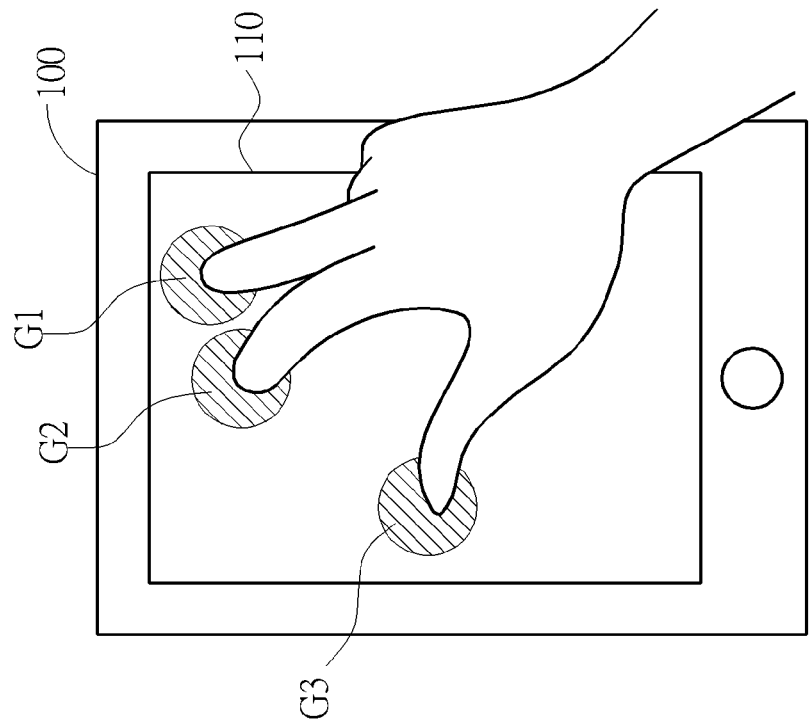
FIG. 5 illustrates image swapping of touch points G1, G2 and G3 in a random manner according to one embodiment of the present invention.
Figure 5:
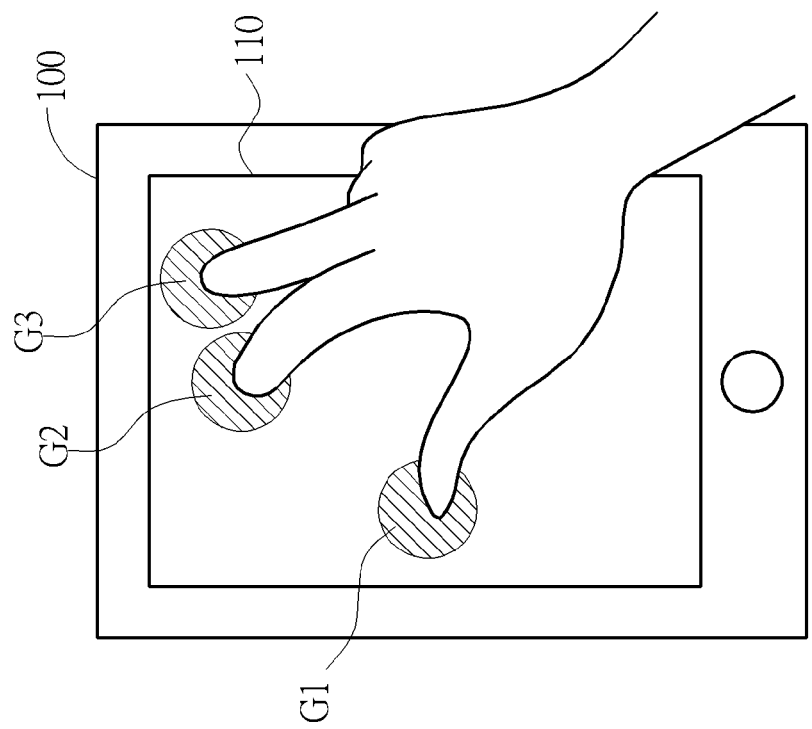

FIG. 5 illustrates image swapping of touch points G1, G2 and G3 in a random manner according to one embodiment of the present invention. As can be observed in FIG. 5, a relative order of the touch points before swapping is (G1, G2, G3) before swapping. After swapping, the relative order of the touch points is (G3, G2, G1), which is shifted in neither clockwise nor counter-clockwise order. Please note that in the embodiments of FIGS. 3-5, the contacts of the touch points can be made simultaneously or sequentially by different fingers or the same finger. The contacts of the touch points can be short taps, long taps long taps-and-moves on the touch points.

Figure 6:
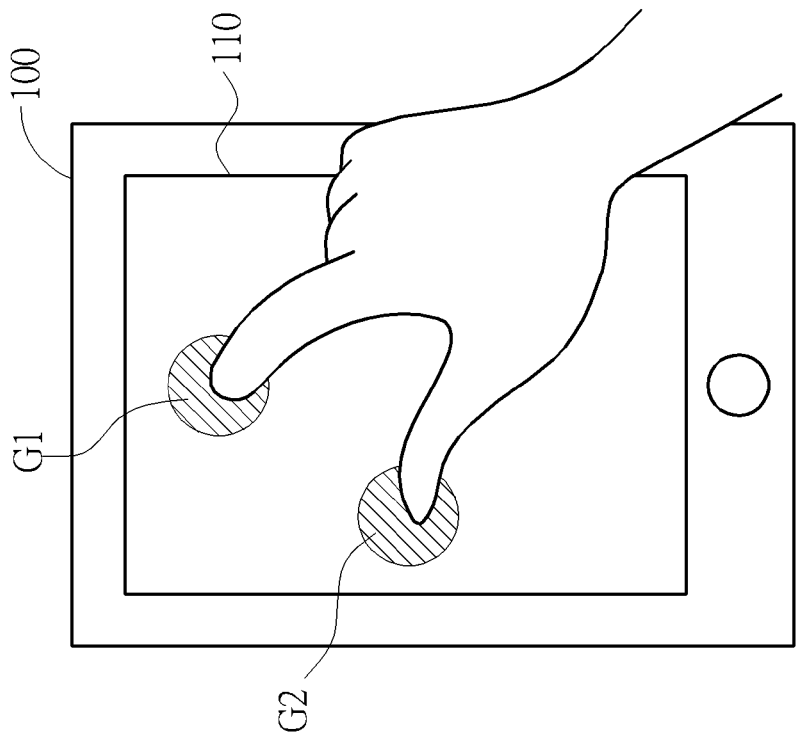
FIG. 6 illustrates image swapping of touch points G1 and G2 according to one embodiment of the present invention.
Figure 6:
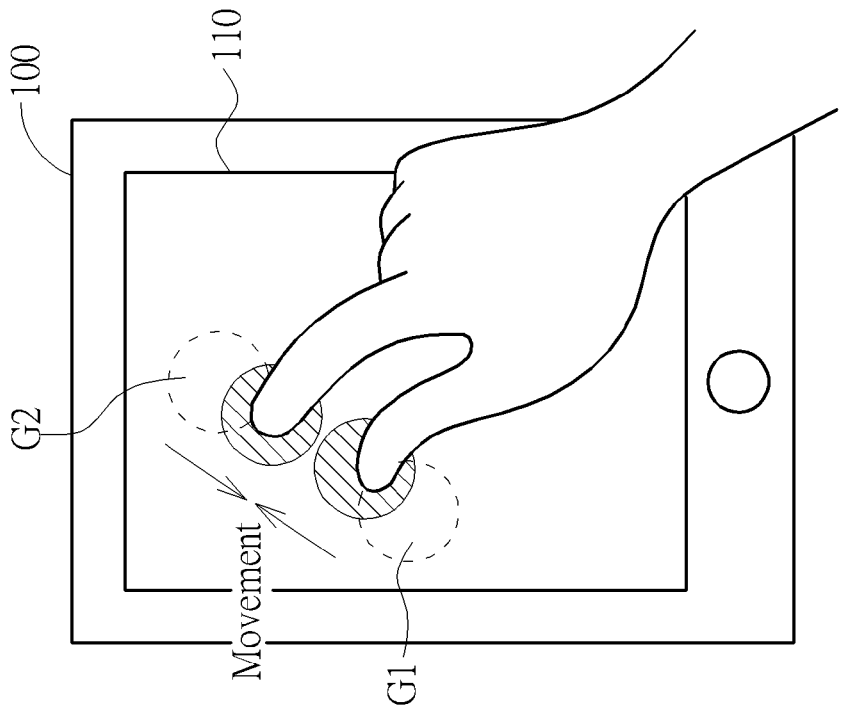

FIG. 6 illustrates image swapping of touch points G1 and G2 according to one embodiment of the present invention. As shown in FIG. 6, two touch points G1 and G2 are triggered and moved by fingers of the user, and the touch screen 110 detects contacts and movements of the touch points G1 and G2. In response to the contacts and movements of the touch points G1 and G2 are detected, the image processor 130 is configured to swap patterns corresponding to the touch points G1 and G2 so that image portions corresponding to the touch points G1 and G2 are exchanged with each other after swapping. The movements of the touch points can be gesture patterns, for example, moving toward each other, moving away from each other, rotating by an angle, and/or other ones predetermined by the electronic device 100. The touch determination unit 120 of the electronic device 100 may determine the gesture pattern of the touch points G1 and G2 and the object swap unit 134 of the image processor may determine the swap pattern according to the gesture pattern.

Figure 7:
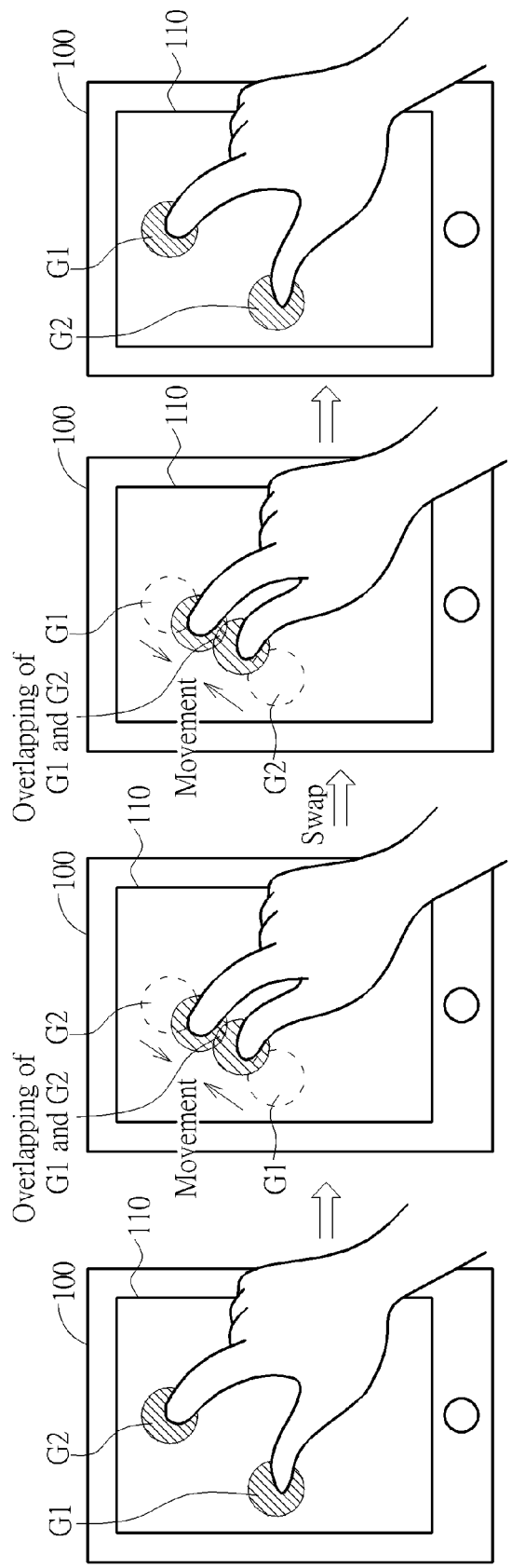
FIG. 7 illustrates image swapping of touch points G1 and G2 in response to contacts of both the touch points G1 and G2 are detected and movements of the touch points G1 and G2 suggesting partial overlap of the touch points G1 and G2 according to one embodiment of the present invention.

In one embodiment related to FIG. 7 of the present invention, the embodiment is configured to swap patterns corresponding to the touch points in response to the touch points are overlapped with each other, i.e. when the touch points collide with each other. FIG. 7 illustrates image swapping of touch points G1 and G2 in response to contacts of both the touch points G1 and G2 are detected and movements of the touch points G1 and G2 suggesting partial overlap of the touch points G1 and G2 according to one embodiment of the present invention. As shown in FIG. 7, two touch points G1 and G2 are triggered and moved by fingers of the user in a first stage. In a second stage, the image portions corresponding to the touch points G1 and G2 are moved along with the movement of the fingers and partially overlapped. In a third stage, in response to the touch screen 110 detects the touch points G1 and G2 are getting closer to a predetermined distance, the image processor 130 swaps the patterns corresponding to the touch points G1 and G2 in response to the relative distance of the touch points is shorter than the predetermined distance. And as a result shown in a fourth stage, when the movements of the touch points G1 and G2 suggesting that they are separating away, the image portion corresponding to the touch points G1 and G2 have been completely swapped and moved back to original position in comparison to the first stage of FIG. 7.

In one embodiment related to FIG. 7, the patterns corresponding to the touch points G1 and G2 are swapped only when the overlapping region between the touch points G1 and G2 is formed and lasted for a predetermined time period, which may be more than one second in certain embodiment of the present invention. Note that the predetermined time period may be dynamically adjusted by the user.

In summary, FIGS. 3, 6 and 7 indicate the timing diagrams of image swapping corresponding to different touch points, and FIGS. 4-5 indicate how the image portions are swapped. Therefore, in most embodiments of the present invention, the timings disclosed in FIGS. 3, 6 and 7 may be utilized for swapping image portions in a determined manner shown as in FIG. 4 or in a random manner as shown in FIG. 5 in response to more than two touch points are detected on the touch screen 110. Note that in most embodiments of the present invention, the timing diagrams shown in FIGS. 3, 6 and 7 for swapping image portions corresponding to touch points may be chosen according to a command received by the electronic device 100 from the user.

In most embodiments of the present invention, image characteristics corresponding to a touch point on the electronic device 100 may relate to an object or a color. Therefore, in response to contacts of touch points are detected, corresponding objects or colors of the touch points are swapped accordingly.

As can be observed from the abovementioned embodiments of the present invention, image portions displayed on a touch screen can be easily swapped on the touch screen with contacts on the electronic device 100 and/or with movements of touch points on the touch screen. Therefore, the user of the electronic device 100, who intends to swap patterns on the electronic device, can be refrained from complicated operations required in conventional electronic devices. Please note that in another embodiment of the invention, the image portions corresponding to the touch points may be part of different images. For example, a first image portion corresponds to touch point G1 belongs to a first image, and a second image portion corresponds to touch point G2 belongs to a second image. The first image and the second image can be displayed on the touch screen at the same time or different time. Consequently, the image swapping is performed on two images, and the image processor 130 identifies image portions in the two images and swaps image portions from one image to another.

Figure 8:
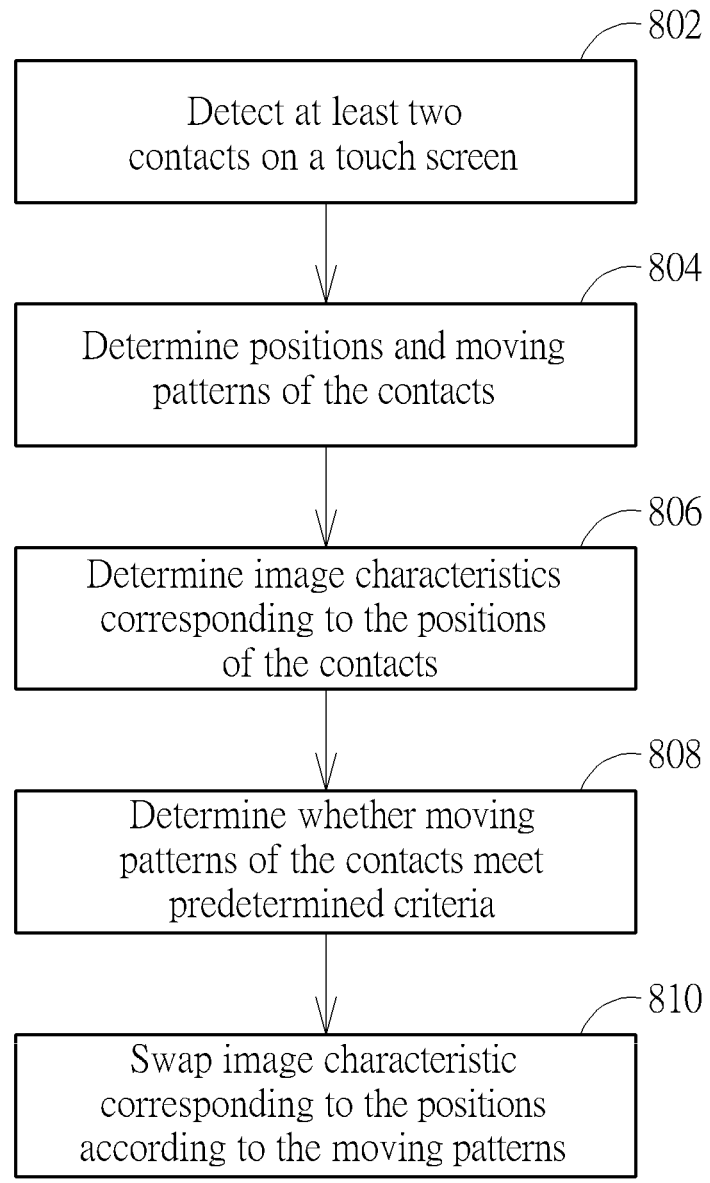
FIG. 8 illustrates the image swapping method for swapping portions of an image displayed on an electronic device according to one embodiment of the present invention.

Please refer to FIG. 8, which illustrates the image swapping method for swapping portions of an image displayed on an electronic device according to one embodiment of the present invention. As shown in FIG. 8, the image swapping method includes steps as the following:

Step 802: Detect at least two contacts on a touch screen of the electronic device, where each of the contacts corresponds to an image portion of the image displayed on the touch screen. The image portion may be an object or a region with certain characteristics.

Step 804: Determine positions and moving patterns of the contacts on the touch screen. The touch screen identifies positions of the contacts and monitors changes of the positions for use to determine the moving patterns of the contacts. The touch screen then sends touch signals comprising the position information, and the touch signals are later processed to derive the moving patterns.

Step 806: Determine image characteristics corresponding to the positions of the contacts. The image characteristics may be predetermined by the electronic device or designated by user, such as object, color, shape, etc. Position information of the contacts may be converted and transmitted to an image processor of the electronic device, and the image processor thus determines positions in the image corresponding to the contacts. Pixels around the positions are processed to obtain corresponding image characteristics, such as color values for example. In addition, positions of other portions within the image having the same image characteristics may also be determined. For example, if the contacts correspond to color characteristics of green and red, other regions having pixels with green and red color value may also be identified.

Step 808: Determine whether the moving patterns of the contacts meet predetermined criteria. The moving pattern may be one of the following gesture patterns: short tap, long tap, tap and drag, tap and hold, etc. And the moving patterns may suggest an order for swapping the image characteristics corresponding to the contacts. For example, in the case that the moving pattern of the contacts is in clockwise direction, the swapping order of corresponding image characteristics is in clockwise order.

Step 810: Swap image characteristic corresponding to the contacts according to the moving patterns. As described in Step 808, the moving pattern of the contacts suggests the swapping order of the image characteristics. For example 3 contacts are detected, and respectively corresponds to colors of red, green and blue by position order and the moving pattern of the contacts is in clockwise direction. The swapping order of the colors would be swap red to blue, green to red, and blue to green.

Please note that in the embodiment of FIG. 8, image swapping may be performed on image portions corresponding to the contacts only. In another embodiment of the invention, the image swapping may be applied to all image portions having image characteristics similar or identical to those corresponding to the contacts. Also in Step 808, in response to the moving patterns do not meet predetermined criteria, image swapping is not performed in Step 810.

Figure 9:
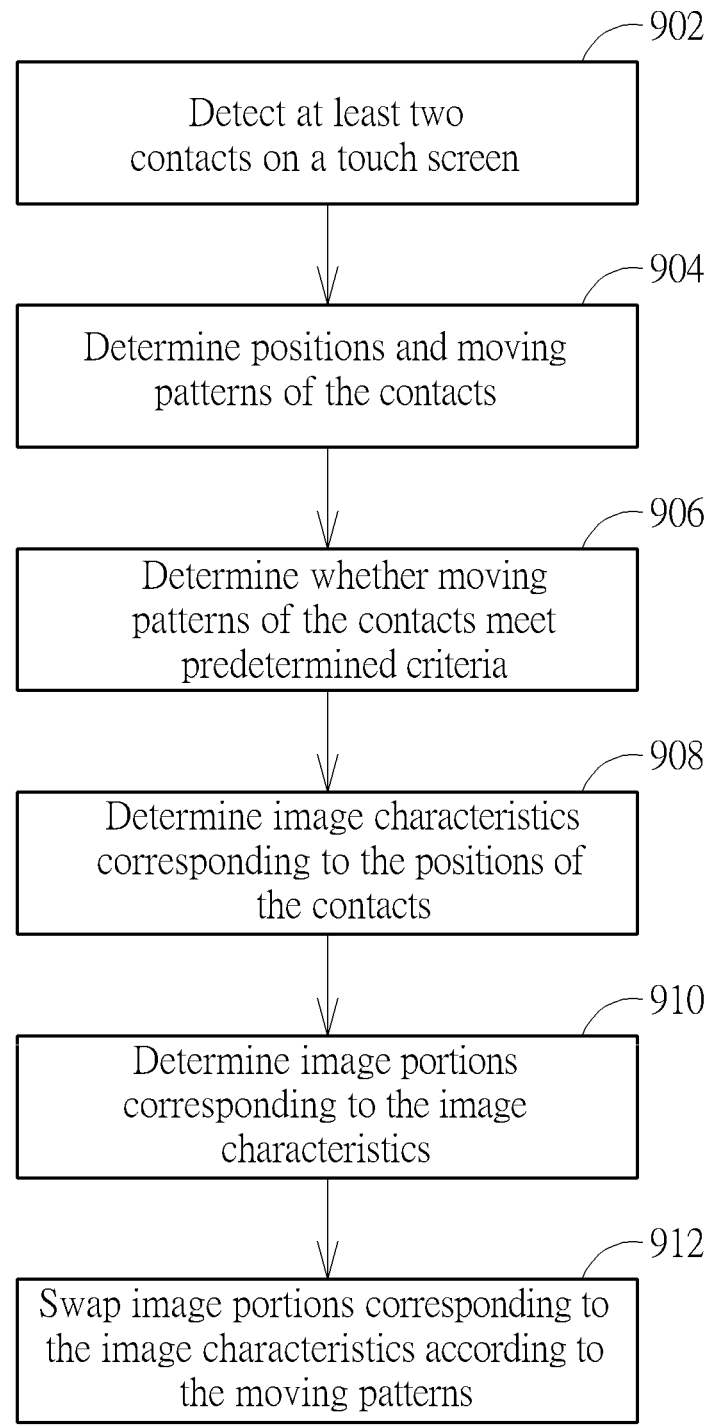
FIG. 9 illustrates the image swapping method for swapping image portions of an image displayed on en electronic device according to one embodiment of the present invention.

Please also refer to FIG. 9, which illustrates the image swapping method for swapping image portions of an image displayed on en electronic device according to one embodiment of the present invention. As shown in FIG. 9, the pattern swapping method includes steps as the following:

Step 902: Detect at least two contacts on a touch screen of an electronic device, where each of the contacts corresponds to an image portion of an image displayed on the touch screen. The image portion may be an object or a region with certain characteristics. The contacts can be made on one or more images in another embodiment of the invention.

Step 904: Determine positions and moving patterns of the contacts on the touch screen. The touch screen identifies positions of the contacts and monitors changes of the positions for use to determine the moving patterns of the contacts. The touch screen then sends touch signals comprising position information, and the touch signals are later processed to derive the moving patterns.

Step 906: Determine whether the moving patterns of the contacts meet predetermined criteria. The moving patterns of the contacts may be one of the following gesture patterns: short tap, long tap, tap and drag, tap and hold, etc. And the moving patterns may suggest an order for swapping the image characteristics corresponding to the contacts. For example, in the case that the moving pattern of the contacts is a tag and drag in clockwise direction, the swapping order is in clockwise order.

Step 908: Determine image characteristics corresponding to the positions of the contacts. The image characteristics may be predetermined by the electronic device or designated by user, such as object, color, shape, etc. Position information of the contacts may be converted and transmitted to an image processor, and the image processor thus determines positions of image portions in the image corresponding to the contacts. Pixels around the positions are processed to obtain corresponding image characteristics more precisely, such as color values for example.

Step 910: Determine image portions corresponding to the image characteristics. Once the image characteristics corresponding to the contacts are determined, the image processor then determines image portions having the same or similar image characteristics. For example, in the case that the image characteristics are colors red, green and blue, all image portions having the same or similar color are identified. The image processor may identify the image portions by finding neighboring pixels having color values within a predetermined range and forming regions larger than a predetermined size. In another example that the image characteristic corresponds to object shape, the image processor may perform face detection or edge detection to find the image portion forming the object. Algorithms for identifying the image portions may vary depending on the type of image characteristics.

Step 912: Swap image portions corresponding to the image characteristics according to the moving patterns. As described in Step 906, the moving pattern of the contacts suggests the swapping order of the image characteristics. For example 3 contacts are detected, and respectively correspond to colors red, green and blue by position order and the moving pattern of the contacts is in clockwise direction. The swapping order of the colors would be swap red to blue, green to red, and blue to green.

Embodiments formed by reasonable combinations/permutations of the steps shown in FIGS. 8-9, by adding the above-mentioned limitations to the steps shown in FIGS. 8-9, and/or by changing the amount of touch points for swapping should also be regarded as embodiments of the present invention.

The present invention discloses an image swapping method and an electronic device utilizing the image swapping method. With the aid of the image swapping method and the electronic device thereof, when a user intends to swap patterns of an image displayed on a touch screen of the electronic device, he or she is merely required to give a few touches corresponding to the patterns on the touch screen or simply move the patterns on the touch screen by predetermined gesture pattern.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image swapping method for use in an electronic device supporting multi-touch inputs, comprising:
    providing an image on a touch screen of the electronic device, comprising providing a user interface on the touch screen for receiving a user command to enable an image swapping function;
    receiving user commands via the user interface to designate a type of characteristics and a swapping order;
    detecting contacts of at least two touch inputs on the touch screen;
    determining positions of the touch points on the touch screen;
    determining characteristics of image portions in the image corresponding to the touch inputs; and
    swapping the characteristics of the image portions according to the swapping order.

2. The image swapping method of claim 1, wherein the determining of the characteristics of the image portions further comprising:
    determining positions in the image corresponding to the touch points according to the positions of the touch points on the touch screen; and
    determining pixels forming the image portions starting from the positions in the images.

3. The image swapping method of claim 1, wherein the characteristics is selected from one of the following: color, object and shape.

4. An image swapping method for use in an electronic device supporting multi-touch inputs, comprising:
    providing an image on a touch screen of the electronic device;
    detecting contacts of at least two touch inputs on the touch screen;
    determining positions of the touch points on the touch screen;
    determining characteristics of image portions in the image corresponding to the touch inputs; and
    swapping the characteristics of the image portions, comprising scaling a size of one of the image portions according to the size of another image portion to be swapped with.

5. An electronic device, comprising:
    a touch screen, configured to display at least an image and to receive at least two touch inputs from a user and transmit touch signals corresponding to the touch inputs, the touch signals comprising position information of the touch inputs;
    a touch determination unit, configured to receive the touch signals and determine gesture pattern corresponding to the touch inputs according to the touch signals, wherein the touch determination unit comprises a gesture pattern table for use to determine the gesture pattern; and
    an image processor, configured to determine image portions corresponding to the touch inputs, identify characteristics corresponding to the image portions and swap characteristics of the image portions according to the gesture pattern.

6. The electronic device of claim 5, wherein the touch determination unit is further configured to map positions of the touch inputs on the touch screen to positions of image portions in the image.

7. An electronic device, comprising:
    a touch screen, configured to display at least an image and to receive at least two touch inputs from a user and transmit touch signals corresponding to the touch inputs, the touch signals comprising position information of the touch inputs;
    a touch determination unit, configured to receive the touch signals and determine gesture pattern corresponding to the touch inputs according to the touch signals; and
    an image processor, configured to determine image portions corresponding to the touch inputs, identify characteristics corresponding to the image portions and swap characteristics of the image portions according to the gesture pattern, wherein the image processor comprises an object identification unit configured to determine the image portions corresponding to the touch inputs according to a predetermined algorithm.

8. The electronic device of claim 7, wherein the image processor further comprises a swap pattern table comprising correspondence of the gesture pattern and respective swap manner of the image portions.

9. The electronic device of claim 7, wherein the touch screen is further configured to provide a user interface for receiving user command to designate a type of the characteristics.

10. The electronic device of claim 7, wherein the characteristics is one of the followings: color, object, and shape.

11. An image swapping method for use in an electronic device comprising a touch screen displaying an image, comprising:
    detecting at least two contacts on the touch screen;
    determining corresponding positions of the contacts in the image and moving patterns of the contacts on the touch screen;
    determining image characteristics of the corresponding positions in the image;
    if the moving patterns of the contacts meet a predetermined criteria, determining a swapping manner for swapping image characteristics corresponding to the moving patterns; and
    swapping the image characteristics of the corresponding positions in the image according to the moving patterns.

12. The image swapping method of claim 11, further comprising:
    determining image portions corresponding to the image characteristics in the image.

13. The image swapping method of claim 12, wherein swapping of the image characteristics further comprises swapping image portions corresponding to the image characteristics.

14. An image swapping method for use in an electronic device comprising a touch screen displaying an image comprising:
    detecting at least two contacts on the touch screen;

determining corresponding positions of the contacts in the image and moving patterns of the contacts on the touch screen;
determining image characteristics of the corresponding positions in the image;
determining image portions corresponding to the image characteristics in the image; and
swapping the image characteristics of the corresponding positions in the image according to the moving patterns, comprising scaling a size of an image portion corresponding one of the image characteristics to another size of another image portion corresponding to another image characteristics to be swapped.

15. The image swapping method of claim 14, further comprising:
receiving a user command via the touch screen for designating a type of image characteristics, the type of image characteristics is one of the followings: color, object and shape.

* * * * *